United States Patent [19]

Boero et al.

[11] Patent Number: 6,052,451
[45] Date of Patent: Apr. 18, 2000

[54] METHOD OF LOOKING UP A TELEPHONE NUMBER IN A DIRECTORY STORED IN MEMORY IN A TELEPHONE RECEIVER

[75] Inventors: Philippe Boero, Paris; Alexandre Zawadzki, Issy les Moulineaux, both of France

[73] Assignee: Alcatel, Paris, France

[21] Appl. No.: 09/188,141

[22] Filed: Nov. 9, 1998

[30] Foreign Application Priority Data

Nov. 10, 1997 [FR] France .................... 97 14102

[51] Int. Cl.[7] .................... H04M 1/56; H04M 15/06
[52] U.S. Cl. .................... 379/142; 379/357; 379/93.23; 379/93.17
[58] Field of Search .................... 379/142, 357, 379/93.23, 93.17

[56] References Cited

U.S. PATENT DOCUMENTS

| | | | |
|---|---|---|---|
| 5,422,938 | 6/1995 | Yamanishi | 379/142 |
| 5,475,744 | 12/1995 | Ikeda et al. | 375/127 |
| 5,506,894 | 4/1996 | Billings et al. | 379/127 |
| 5,546,447 | 8/1996 | Skarbo et al. | |
| 5,771,283 | 6/1998 | Chang et al. | 379/142 |
| 5,903,632 | 5/1999 | Brandon | 379/93.23 |
| 5,984,507 | 4/1999 | Hatamura | 379/93.23 |

FOREIGN PATENT DOCUMENTS

| | | |
|---|---|---|
| 0 494 525 A2 | 7/1992 | European Pat. Off. . |
| 0 501 903 A1 | 9/1992 | European Pat. Off. . |
| 0 624 966 A2 | 11/1994 | European Pat. Off. . |

*Primary Examiner*—Curtis A. Kuntz
*Assistant Examiner*—Quoc Tran
*Attorney, Agent, or Firm*—Sughrue, Mion, Zinn, Macpeak & Seas, PLLC

[57] ABSTRACT

A method of looking up among numbers stored in a directory of a telephone receiver a number that is optimal given the calling party number of an incoming call to the telephone receiver and allowing for the various prefixes specific to different telephone networks and different countries.

2 Claims, 2 Drawing Sheets

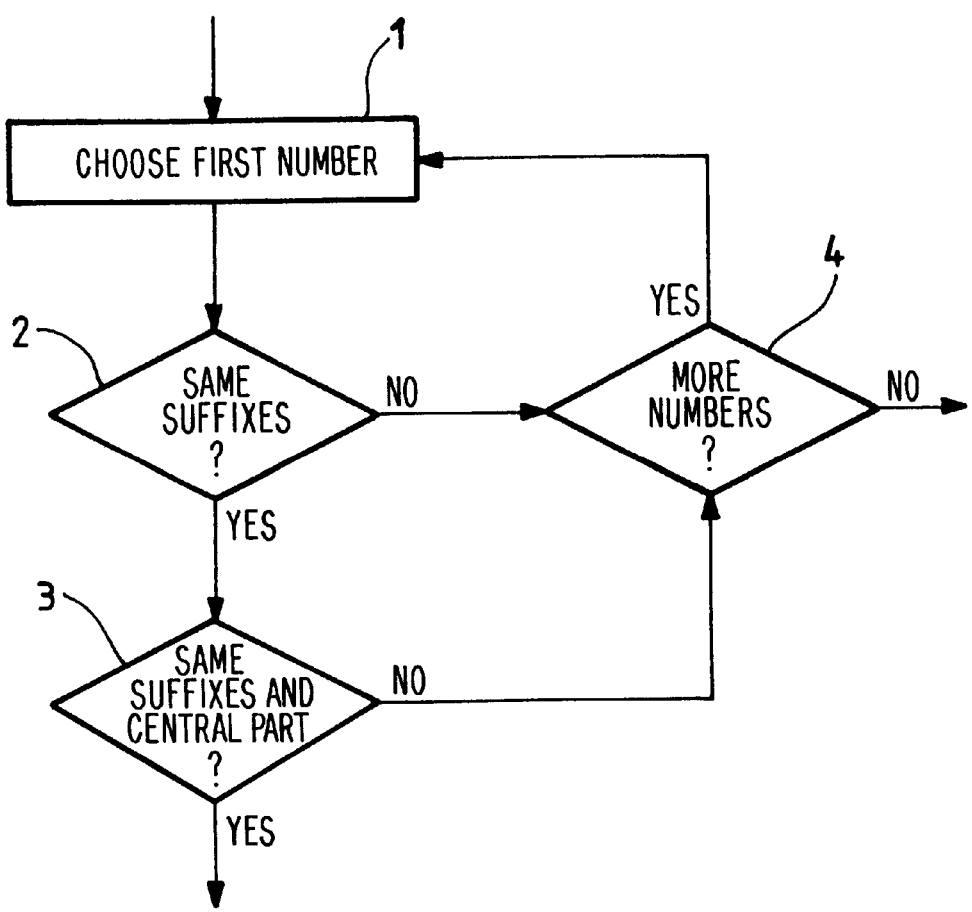

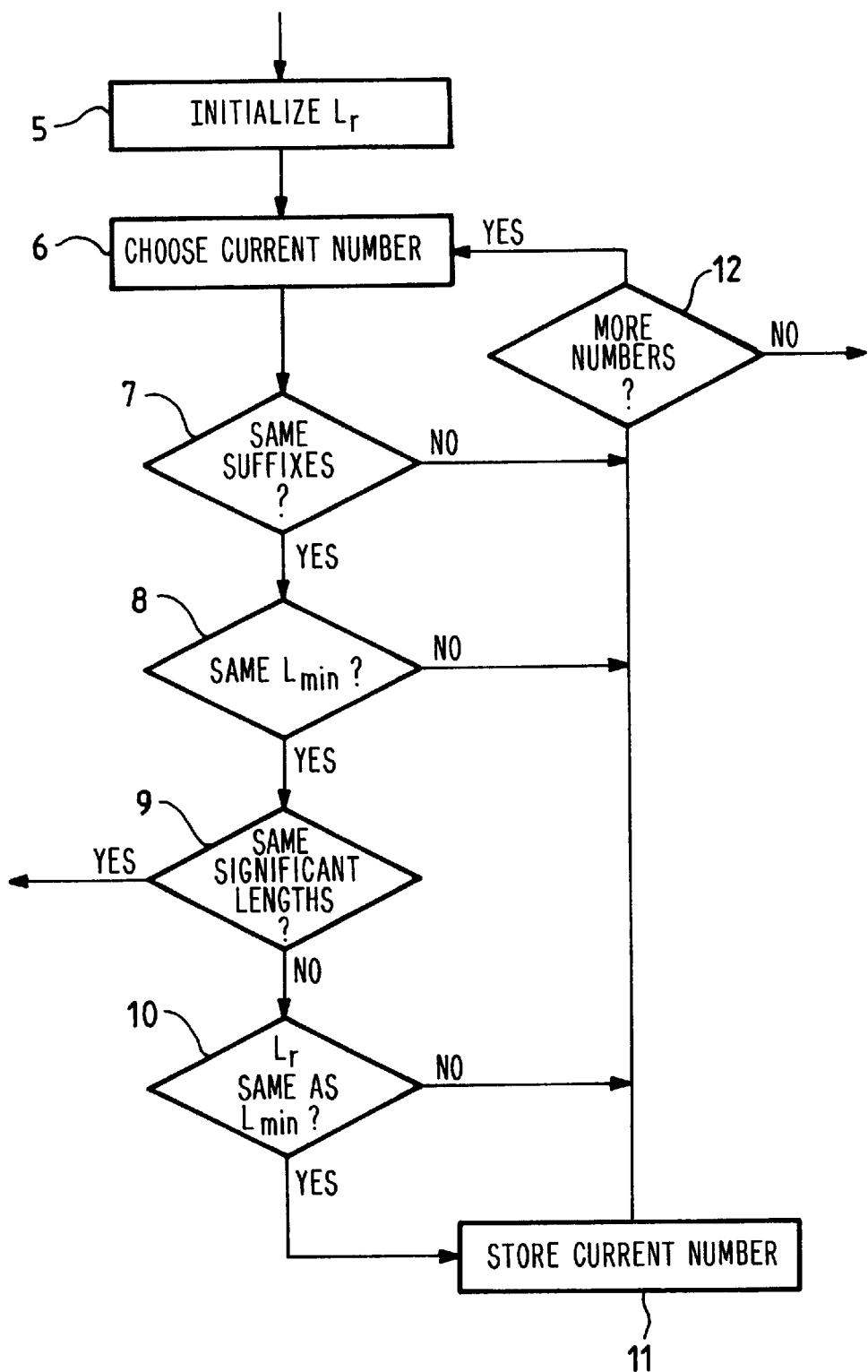
FIG_2

METHOD OF LOOKING UP A TELEPHONE NUMBER IN A DIRECTORY STORED IN MEMORY IN A TELEPHONE RECEIVER

BACKGROUND OF THE INVENTION

1. Field of the Invention

The present invention concerns a method of looking up a telephone number in a telephone directory in an electronic memory. The invention finds one application in telephone terminals whether they are mobile, like GSM (Global System for Mobiles) mobile terminals, or fixed.

2. Description of the Prior Art

When a telephone terminal receives an incoming call, it can offer the service of displaying the name of the calling party rather than their telephone number.

To this end the telephone terminal can hold in an electronic memory a telephone directory enabling it to establish the correspondence between the telephone number and the name of the person.

There are already methods of establishing this correspondence quickly.

FIG. 1 shows one particular method, for example. Its principle is to compare the calling party number and each of the numbers stored in the directory in two stages in order to optimize the searching time.

To this end, a telephone number is considered to comprise three parts: a suffix, a central part and a prefix. The division between the central part and the suffix is arbitrary. For example, the prefix can be considered to consist of the last four digits and the central part of the following digits. The suffix can also be considered to be of zero size, which amounts to considering only two parts: the prefix and the central part.

The prefix is formed of header digits that are governed by international or regional considerations.

In the prior art method a first number is chosen in the telephone directory in step 1 in FIG. 1. A first comparison is then effected in step 2, based on the suffixes of the two numbers to be compared (i.e. the calling party's number and the number previously chosen).

If the comparison fails step 4 is executed to determine if there are telephone numbers in the telephone directory that have not yet been chosen. If there are any the method loops to step 1 of choosing the number; otherwise it stops on a failure.

If the comparison of the two suffixes succeeds, a second comparison is effected on the central part and the suffix (step 3 in FIG. 1). If this comparison fails step 4 is executed, as previously. If it succeeds, the process stops with the last number chosen as the result.

The manner in which the numbers are chosen in step 1 of the method is immaterial. It can be by a sequential choice in the telephone directory, for example.

Nevertheless, this prior art method is inadequate given the possible multiplicity of prefixes for the same telephone number. At present there is no standard covering these prefixes and their content varies for the same number depending on the telecommunication network concerned.

For example, a user residing in Italy has a mobile telephone with the number "01xxxxxxxx". The same user, on traveling to France, calls another user and their calling party's number is "01xxxxxxxx".

If "+391xxxxxxxx" is the number contained in the directory of this other user (39 being the international code for Italy) the prior art method will be incapable of finding the number "01xxxxxxxx" on receiving the call.

The aim of the present invention is therefore to solve the problem raised by the multiple prefixes of a telephone number.

SUMMARY OF THE INVENTION

To this end, the invention consists in a method of looking up among numbers stored in a directory of a telephone receiver a number that is optimal given the calling party number of an incoming call to the telephone receiver, consisting in initializing a variable referred to as the optimal length to the value zero and iterating the following ordered steps for all the numbers stored in the directory:

a) choosing a current telephone number in the directory, b) comparing suffixes of the incoming calling party number and the current number, c) if the comparison succeeds, effecting a second comparison with the minimal significant length calculated between the significant length of the incoming calling party number and the significant length of the current number, d) if the second comparison succeeds, effecting a third comparison between the significant length of the incoming calling party number and the significant length of the current number, e) if the third comparison succeeds, storing the current number in memory as the optimal number, f) if the third comparison fails and if the optimal length is less than the minimal significant length, storing the current number in memory as the optimal number and assigning the value of the minimal significant length to the optimal significant length.

The features of the present invention will become more clearly apparent in the following description in conjunction with the accompanying drawings.

BRIEF DESCRIPTION OF THE DRAWINGS

FIG. 1, already described, shows a prior art method of looking up a telephone number in a directory.

FIG. 2 shows the method of the present invention.

DETAILED DESCRIPTION OF THE PREFERRED EMBODIMENT

Step 5 in FIG. 2 consists in initializing a variable referred to hereinafter as the optimal significant length ($L_r$) to the value zero. The role of this variable is to measure the quality of the best solution found at the end of a particular number of iterations. The higher the value of the optimal significant length, the better the solution found.

Step 6 consists in choosing a current number from the numbers stored in the telephone directory. This step is similar to step 1 in FIG. 1. Once again, the choice can be made in the sequential order of storage in the directory.

Step 7 consists in comparing the suffix of the current number and the suffix of the incoming calling party number. This comparison is also similar to that of step 2 in FIG. 1. The size of the suffix can be 4, for example, but note that it can also be zero so that this step is coincident with the next one.

If the comparison fails (i.e. if the two suffixes are different) the method returns to step 6, i.e. to choosing a new current number in the directory.

If the comparison succeeds step 8 of the method is executed. It consists in comparing the current number and the incoming calling party number on the basis of the minimal significant length, i.e. whichever of the significant length of the incoming calling party number and the significant length of the current number has the lower value.

In the same fashion as previously, if the comparison fails the method returns to step 6 of choosing a new current number in the directory.

The next step is step 9 in FIG. 2. It consists in comparing the significant length of the incoming calling party number with the significant length of the current number. If the two lengths are the same there is no benefit in continuing the search although there is no disadvantage in doing so either, as it is impossible to find a more optimal number among those stored in the directory. Consequently, in a preferred embodiment of the method of the invention the search is stopped when the two significant lengths have the same value.

Otherwise a comparison is effected (step 10) between the optimal significant length ($L_r$) and the minimal significant length ($L_{min}$), these two lengths being as previously defined.

If ($L_r$) is less than ($L_{min}$) then, in a step 11, the current number is stored in memory as the optimal number and the optimal significant length ($L_r$) is allocated the value of the minimal significant length ($L_{min}$). In other words, the current number is considered to be the best solution found up to the present iteration.

Step 12 consists in testing if all of the directory has been tested. If there are still numbers that have not been tested the algorithm loops to step 6 of choosing a current number.

Otherwise, the algorithm terminates with the optimal number previously stored in memory, if any, as its solution.

There is claimed:

1. A method of looking up among numbers stored in a directory of a telephone receiver a number that is optimal given the calling party number of an incoming call to said telephone receiver, consisting in initializing a variable referred to as the optimal length to the value zero and iterating the following ordered steps for all the numbers stored in said directory:

a) choosing a current telephone number in said directory,
   b) comparing suffixes of said incoming calling party number and said current number,
   c) if said comparison succeeds, effecting a second comparison with the minimal significant length calculated between the significant length of said incoming calling party number and the significant length of said current number,
   d) if said second comparison succeeds, effecting a third comparison between said significant length of said incoming calling party number and said significant length of said current number,
   e) if said third comparison succeeds, storing said current number in memory as said optimal number,
   f) if said third comparison fails and if said optimal length is less than said minimal significant length, storing said current number in memory as said optimal number and assigning the value of said minimal significant length to said optimal significant length.

2. A method as claimed in claim 1 wherein if said third comparison succeeds said search terminates with said current number as its result.

* * * * *